Nov. 28, 1933.  A. BRADLEY  1,936,931
MACHINE FOR MAKING WIRE FABRIC
Filed Aug. 22, 1931   9 Sheets-Sheet 1

Inventor:
Albert Bradley.

Nov. 28, 1933.　　　　A. BRADLEY　　　1,936,931
MACHINE FOR MAKING WIRE FABRIC
Filed Aug. 22, 1931　　9 Sheets-Sheet 5

Fig. 5

Inventor:
Albert Bradley
by
Charles…
Attys.

Nov. 28, 1933.   A. BRADLEY   1,936,931
MACHINE FOR MAKING WIRE FABRIC
Filed Aug. 22, 1931   9 Sheets-Sheet 7

Inventor:
Albert Bradley.

Patented Nov. 28, 1933

1,936,931

UNITED STATES PATENT OFFICE 1,936,931

MACHINE FOR MAKING WIRE FABRIC

Albert Bradley, Sterling, Ill., assignor to Northwestern Barb Wire Company, Sterling, Ill., a corporation of Illinois Application August 22, 1931. Serial No. 558,716

28 Claims. (Cl. 140—4)

This invention has to do with machines for making wire fabric for fences and other uses, and is particularly, though not necessarily, designed for the manufacture of fabric of this character of herring-bone design.

Another object of the invention consists in the provision of an improved machine for fabricating a wire fence or the like embodying different sizes of mesh by the employment of differential weaving mechanism.

A further object of the invention resides in the provision of a machine of this character embodying instrumentalities for weaving wire fabric having various sizes of mesh, said instrumentalities providing a single support simultaneously feeding all woof wires and providing for lost motion of such of the wires as form the smaller size or sizes of mesh.

A further object of the invention includes the provision of means for guiding the selvages of the finished fabric so that the same will be wound on the receiving reel evenly.

This invention contemplates as another of its objects a new method by which multi-mesh wire and other fabric are produced.

Another object of the invention is to provide means for preventing undesired approach of the warp wires of the meshes, particularly the smaller meshes, due to tension in the woof wires.

Another object of the invention resides in the provision of cam means carried by a feed roll, said means serving to shift various woof wires in varying amounts, depending upon the size of mesh of the fabric with which such wires are to be associated in the finished product.

Another object of the invention resides in the provision of a device for picking up the fabricated wire mesh, holding the various warp wires of the fabricated mesh spaced apart the proper distances in accordance with the various sizes of mesh, and delivering the same to the receiving reel about which the finished product is wound.

Other objects and advantages of the invention will appear as the description proceeds.

This invention is of the general character illustrated and described in Dwiggins Letters Patent No. 1,270,129, issued June 18, 1918, comprising an endless conveyor carrying a continuous series of twisting mechanisms for twisting the woof about the warp. These twisting mechanisms carry means for receiving and carrying the warp wires in straight lines from the source of supply along the machine in the direction of movement of the conveyor, and means is provided for picking up the fabricated wire mesh and conducting the same to the reel upon which the same is to be wound.

In the patent mentioned, the design of wire mesh fabric produced is of substantially hexagon shape, the twisted portions forming two opposite sides of each hexagon. While instrumentalities are provided in the machine disclosed in this patent for producing a wire fence of two different sizes of mesh, such a machine would be incapable of producing a wire fabric of herring-bone mesh. This patented construction fails to provide means for maintaining the warp strands the desired distance apart. The weaving of the woof strands back and forth between the warp strands results in a tensioning of the woof strands as a result of which certain of the warp strands tend to approach one another. The result is that the finished product is often uneven.

Furthermore, in machines of this character heretofore in use, inadequate means were provided for maintaining the selvages of the wound fabric even, and as a result the reels of wire fabric produced by these machines required greater shipping space and were rather inconvenient for handling.

According to the general features of the invention, the disadvantages of previous constructions as above noted are overcome and novel instrumentalities are availed of for producing a herring-bone, multi-mesh wire fabric. The latter feature involves the provision of a weaving or distributor head or roll for the woof strands, said roll employing a plurality of cams by which successive woof guiding elements are caused to shift laterally in varying amounts, the various elements being arranged in alternating series, each series being arranged in accordance with the spaces between the warp threads of the various sizes of mesh. The approaching and receding movements of the various series of elements caused by the cams result in lateral shifting of the woof wires of the largest mesh a distance substantially equal to the width of that mesh and, of the wires of the smaller meshes, correspondingly smaller distances.

Means is provided to hold the strands of the finished fabric in proper spaced relation so that, when wound on the reel, the fabric will be even thruout, and not distorted. Guiding means cooperating with the reel serve to hold the selvages of the fabric in parallel planes.

This invention (in a preferred form) is illustrated in the drawings and hereinafter more fully described.

On the drawings:

Figures 4 and 5 are fragmentary plan views respectively of the right and left halves of the machine.

Referring now more particularly to the drawings, wherein the same reference characters are applied to the same parts throughout, the numeral 1 indicates a frame which is carried on legs 2. The frame comprises side members 3 providing bearings for the shafts 4 carrying the end and intermediate sprockets 5. The forward shaft 4 receives power from a suitable source (not shown) and drives the shaft 6 thru the medium of a chain drive 6ª. The shaft 6 carries power transmitting mechanism such as gears 7 meshing with a gear 8 on the shaft 9 carrying the finishing reel 10 on which the fabric is wound. A bar 11 carries guide elements 12 for the selvages of the fabric to be wound on the finishing reel 10. A transverse frame member 13 intermediate the cross shafts 4 and a rear cross frame member 14 serve to connect and brace the side frame parts 3. An endless chain 15 is carried by the sprockets 5, and passes about stationary top, bottom and curved end plates 16, 17 and 18, respectively, in the direction indicated by the arrows 15ª.

Five chain sections are provided to cooperate with the five sprockets 5 on each shaft 4.

*Twisting mechanism.*—The sprocket chain 15 consists of outside links 19 and inside links 20, the outside links 19 having projecting arms 21 to which two series of guide bars 22 are secured transversely of the machine. One series 22 is secured to the three chain sections on the left side of the machine, looking toward the front, and the other series is secured to the three chain sections on the right side of the machine, the bars of each series alternating with those of the other. It will be noted that the two intermediate chain sections are also provided with links 19 and 20 having arms 21 to which the guide bars 22 are secured, as shown in Figure 2.

That series of guide bars 22 extending from the left hand side of the machine is secured to the arms 21 on the outside links 19 of the left outer and intermediate chain sections and to the arms 21 on the middle links 20 on the right intermediate chain section. The guide bars 22 extending from the right side of the machine are secured to arms 21 on the middle links 20 on the left intermediate chain section and on the outside links 19 of the two right chain sections.

Figure 6:
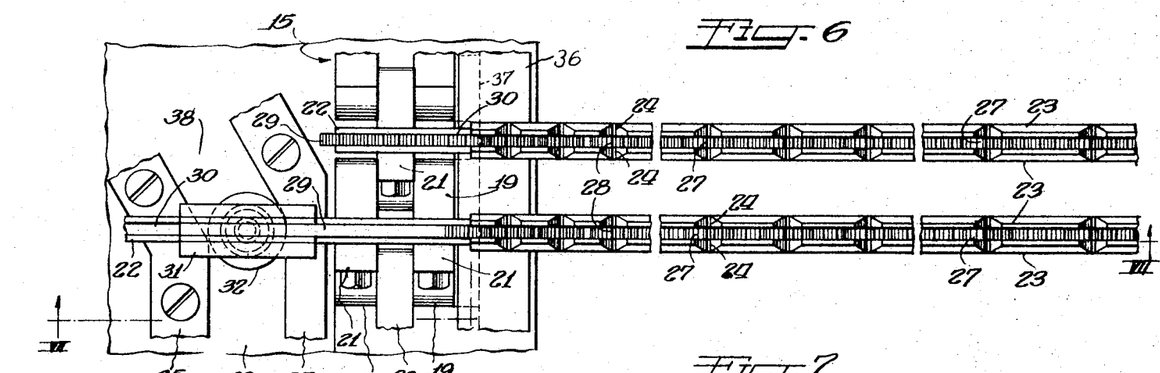
Figure 6 is a fragmentary plan view showing details of the wire twisting mechanism.

Twister holding plates 23 are secured on opposite sides of each guide bar 22 as seen clearly in Figure 6. The plates 23 extend across the central portion of the machine and are substantially coextensive with the maximum width of fence or fabric to be manufactured and have registering vertical notches 24 affording entry of the line wires 25 and woof wires 26 of the fabric. Twisting wheels or twisters 27 are rotatably mounted in and between the plates 23 and are provided with radial slots 28 normally registering with the slots 24. Each twist gear 27 meshes with and is rotated by a rack 29 which extends transversely of the machine and between the plates 23 and slides in a longitudinal groove 30 in the upper edge of each guide bar 22.

Figures 2, 14, 15:
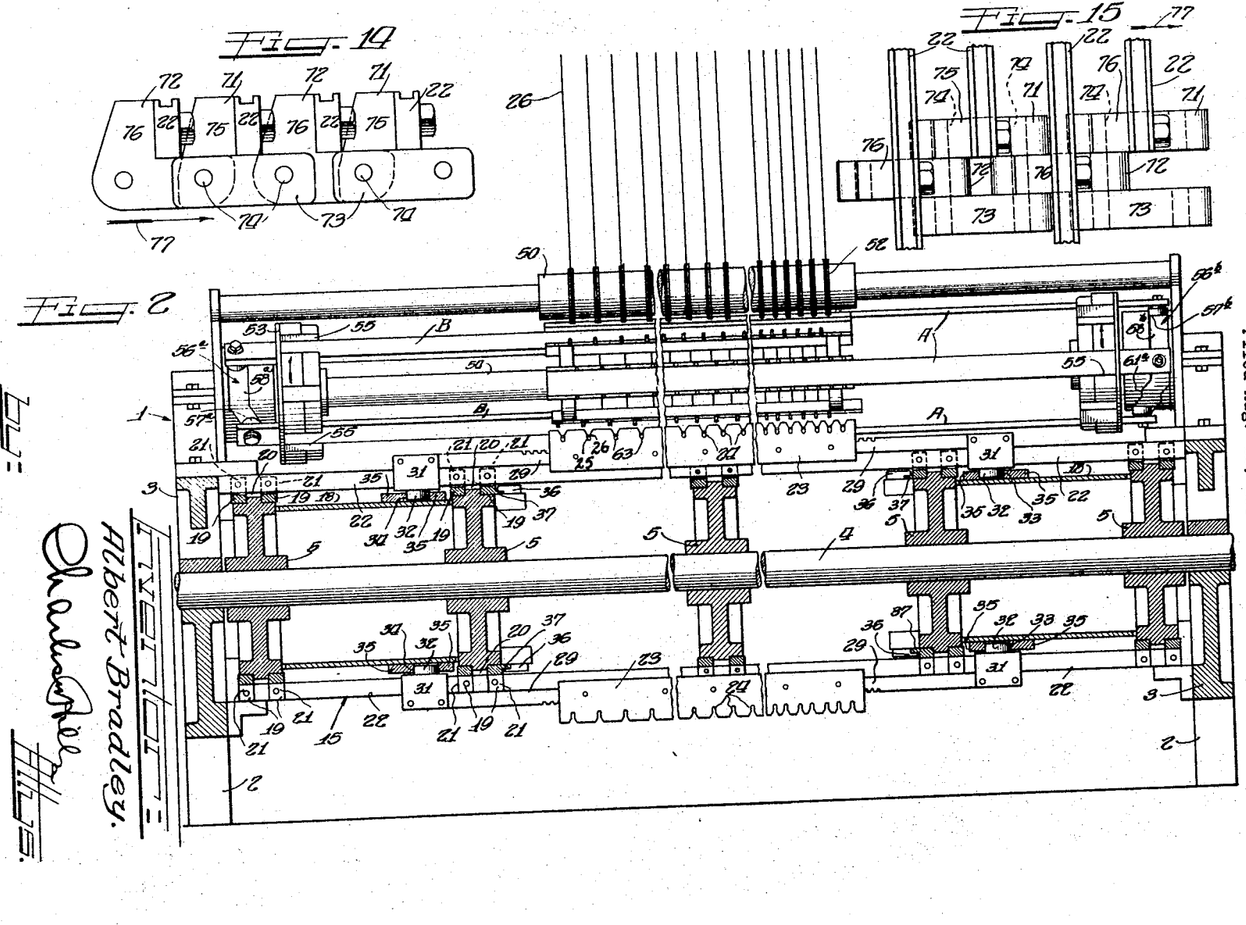
Figure 2 is a fragmentary transverse section taken approximately as indicated by the line II—II in Figure 1.
Figures 14 and 15 are respectively elevational and plan views of a modified form of chain construction.
Figure 3:
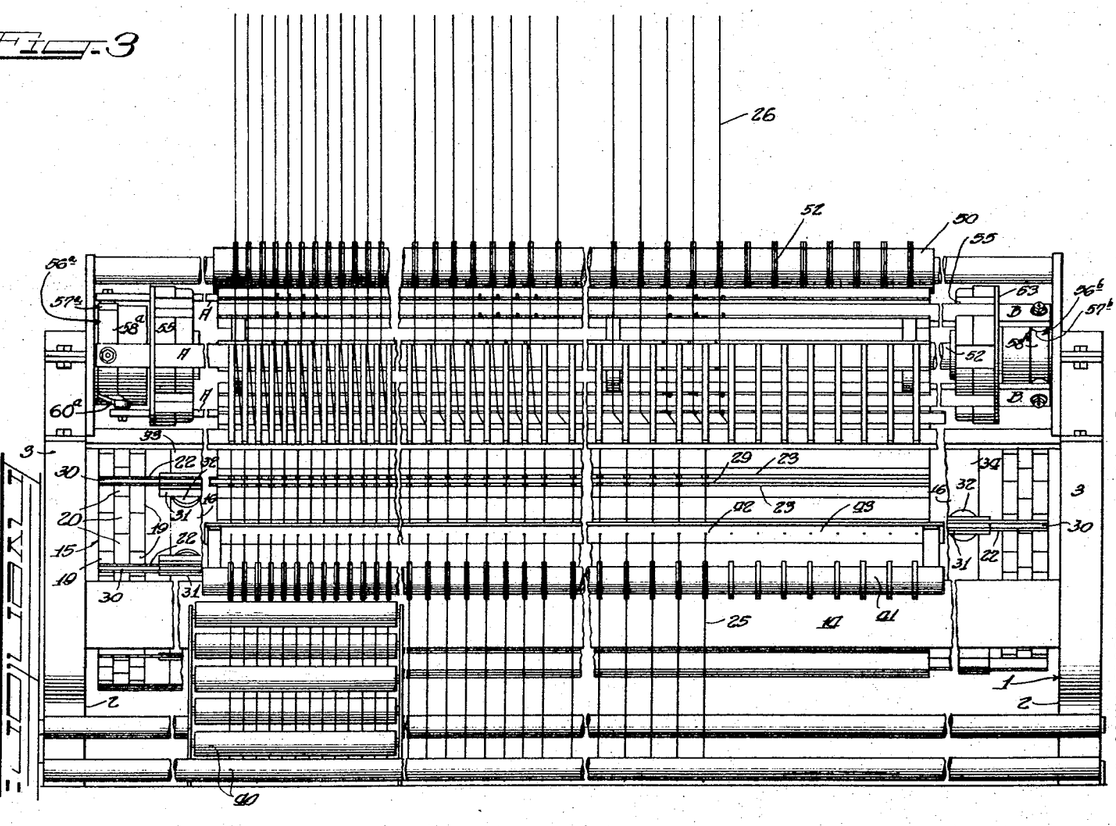
Figure 3 is a fragmentary rear elevational view of the machine taken as indicated at III—III, Figure 1.
Figures 7, 8:
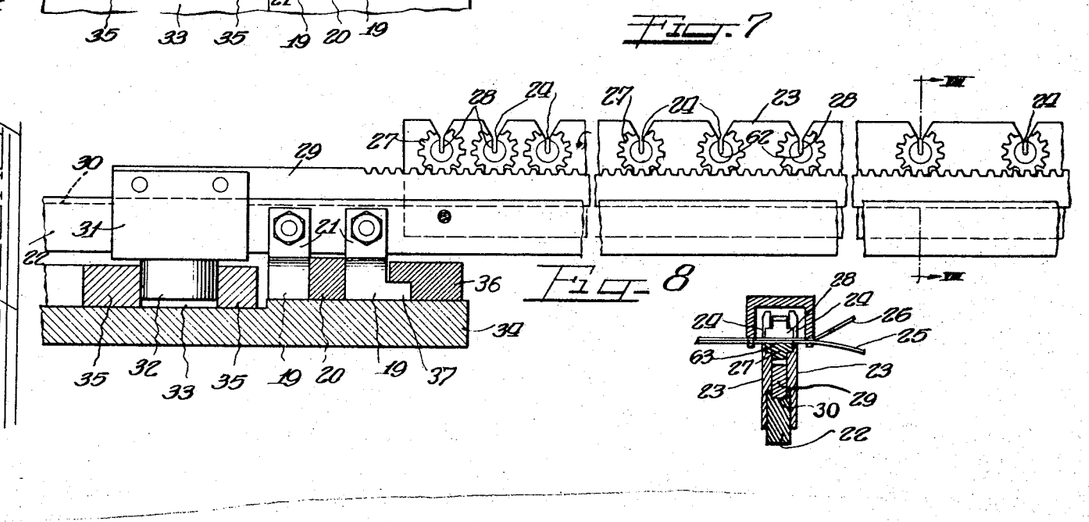
Figure 7 is a view partly in section and partly in elevation, in the plane at substantially right angles to the view shown in Figure 6.
Figure 8 is a fragmentary sectional view taken substantially in the plane designated VIII—VIII in Figure 7.

Each rack 29 is actuated by a U-shaped member 31 which is slidably mounted on a guide bar 22 and which is secured to the rack 29 as seen in Figures 2 and 7. A roller 32 is loosely mounted on each U-shaped member 31 and projects into one of the guideways 33, 34. One of these guideways is near each side of the machine, as seen in Figures 2 and 3, and each is formed by a pair of oppositely disposed bars 35 which are secured to the top, bottom and curved end plates 16, 17 and 18, respectively. Chain guides 36, associated with the plates 16, 17 and 18, overlap the projections 37 on the innermost outside links 19 as shown in Figures 6 and 7.

Figure 4:
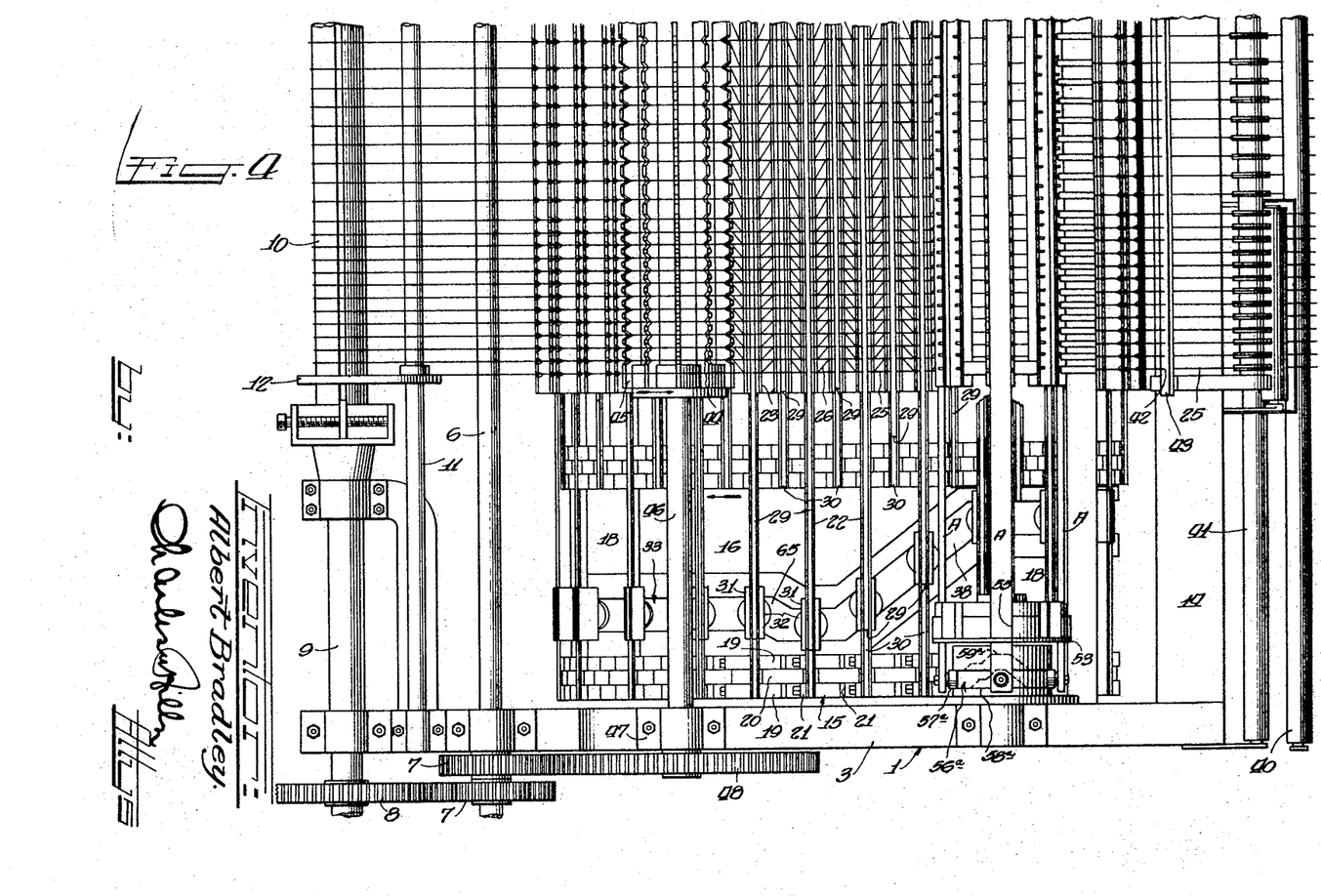
Figure 5:
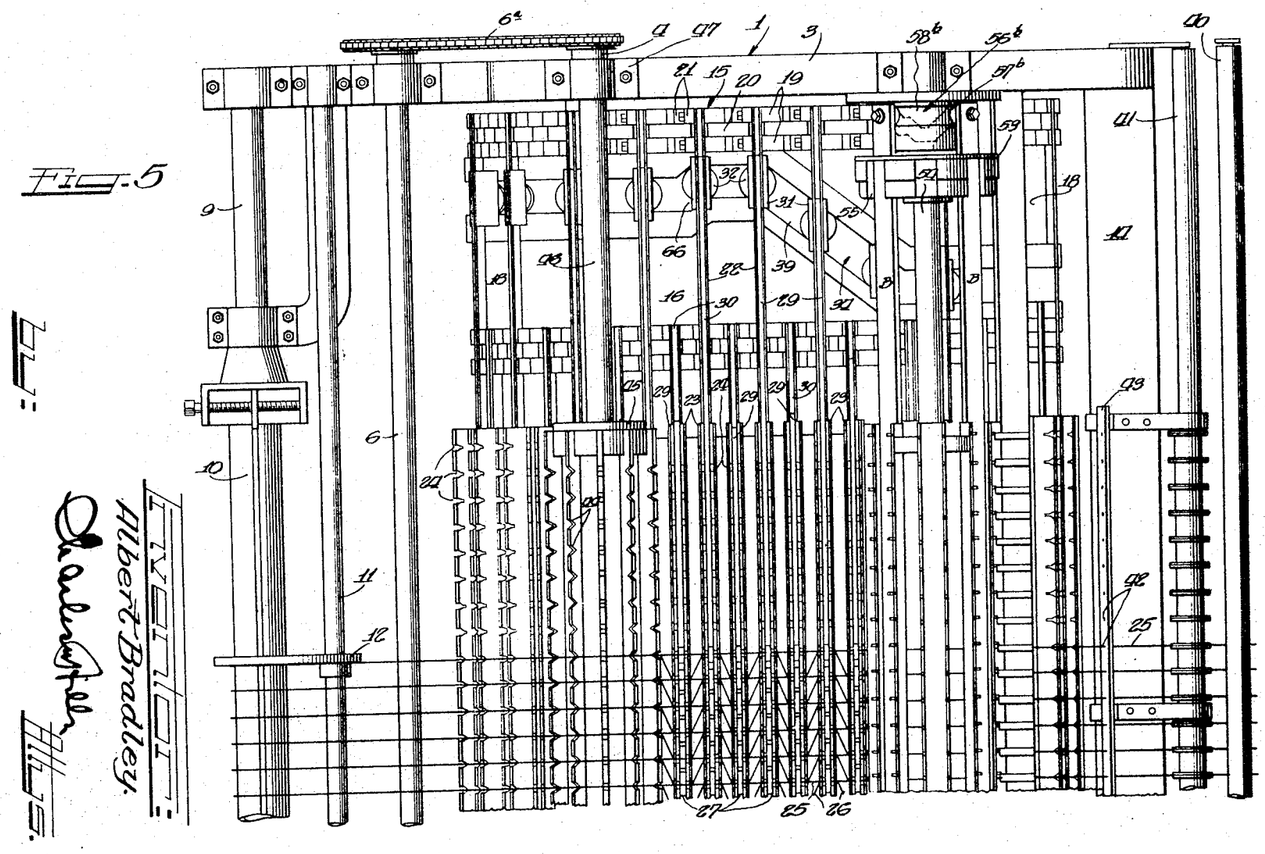

The guideways 33 and 34 reciprocate the two sets of alternate racks simultaneously and in opposite directions, the left guideway 33 actuating the left set of racks 29 and the right guideway 34 operating the right set of racks 29. The inclined portions 38 and 39 of the guideways 33 and 34, respectively, are inclined in opposite directions as shown in Figures 4 and 5. The guideways 33 and 34 are endless and it will be understood that the inclined portions 38 and 39 of the guideways arranged beneath those shown in Figures 4 and 5 actuate the rollers 32 in a reverse direction to that just described and thus serve to bring the racks 29 back to their starting points and keep them thus until after the twist wheels 27 receive the woof wires 26 to be twisted about the line wires 25. The further travel of the chain 15 causes the racks 29 to be properly actuated by said guideways 33 and 34, a more detailed description of the twisting operation appearing later herein.

*Transfer of the woof wires.*—The strands or wires of which the fabric is formed comprise the warp 25 and the woof 26. For the purpose of the present illustration, arrangement is made for the formation of a fence or wire fabric having three progressive sizes of mesh. In accordance with this arrangement, the twister holding plates 23 are individually provided with their slots 24 arranged in accordance with the different sizes of mesh and the lateral dimension or height of each size, as shown in Figure 2. The warp wires 25 are received from a suitable source (not shown) at the extreme right of Figure 1 and after passing about the various tensioning and guide rolls 40 and 41, pass through openings 42 in a guide bar 43 and carried by the frame member 14 adjacent the rear of the machine, the openings 42 being spaced in accordance with the predetermined meshes of the fabric to be made. Thus these openings 42 are alined with the slots 24 and 28 in the twister holding plates 23 and twister gears 27, respectively.

The warp wires 25 continue forward, resting in the bottoms of the slots 24 and 28 and are then drawn up into the grooves 44 alined therewith in the removing or pick-up roller 45. The roller 45 is carried by a shaft 46 journaled in the brackets 47 of the machine. This shaft carries a gear 48 meshing with and driven by the inner of the gears 7 as seen in Figure 4.

Figure 1:
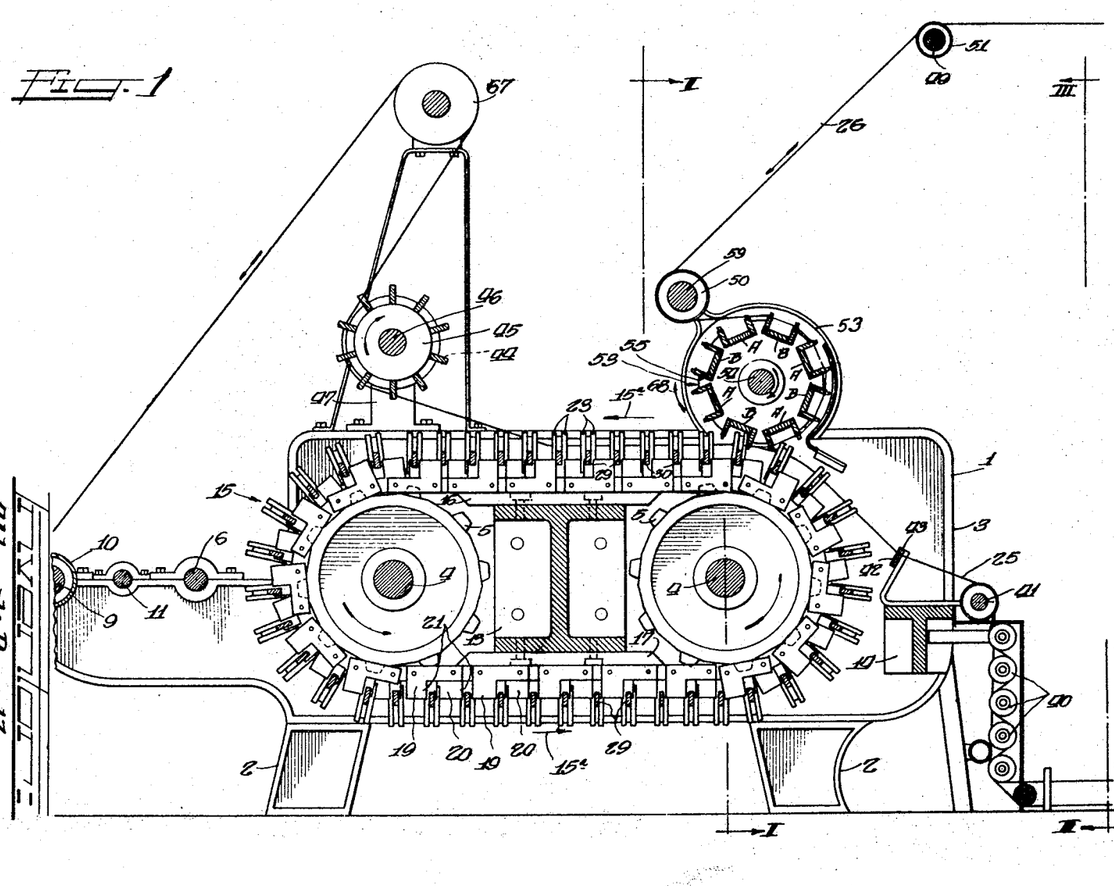
Figure 1 is a fragmentary longitudinal sectional view of a machine constructed in accordance with the present invention.

The woof wires 26 lead from a suitable source (not shown) at the upper right of Figure 1 over guide rolls 49 and 50, whence they pass onto and about a substantially major portion of the periphery of the transfer or weaving or distributor roll. The rolls 49 and 50 are provided with grooves 51 and 52, disposed in vertical planes spaced apart in accordance with the different meshes of the fabric and staggered with relation to the warp wires 25 and the slots in which they are carried.

The weaving or distributor or transfer roll 53 is mounted on a shaft 54 for rotation by a suitable source of power (not shown) and is provided with longitudinal guides 55 or series of guides in which alternate transfer bars A and B are reciprocable and in which said bars are carried circumferentially as the roll 53 rotates, eight such bars being herein disclosed for illustrative purposes. Stationarily mounted at the adjacent ends of the roll 53 are cylindrical cams comprising circumferential slots 56$^a$ and 56$^b$ adapted to receive followers in the form of rollers 57$^a$ and 57$^b$ attached to the adjacent outer ends of the bars A and B, respectively.

The major portion of each cam slot constitutes the dwell or trough 58$^a$ or 58$^b$ disposed in a plane at substantially right angles to its axis. The remainder of each cam slot comprises a crest 59$^a$ and 59$^b$ which is spaced axially from the dwell a distance equal to the size of the smallest mesh of the fabric to be made, which for illustrative purposes is 1¼", the trough and the crest being connected on one side by inclined slot portions 60$^a$ and 60$^b$. The length of the crest may vary within certain limits to be set forth with particularity later in the description and is stepped to the dwell on its other side to provide an intermediate portion 61$^a$ and 61$^b$ approximately half the height of the crest, the purpose of which will appear later.

The cam slots are substantially exactly in phase with each other, that is, the troughs, crests, intermediate portions, and sides of the crests and intermediate portions are so related that they are symmetrical with respect to a plane at right angles to the axis of the roll and passing centrally between the cam slots.

The bars illustrated are so arranged that four of them, designated A, have their rollers 57$^a$ disposed in one cam slot 56$^a$ and are actuated by the latter, and the other four, designated B, are similarly associated with the other cam slot 56$^b$. Moreover, the bars associated with each cam alternate with those associated with the other cam. Thus it will be apparent that each bar will be successively shifted inwardly by its respective cam slot a distance equal to the height of the cam crest for each revolution of the roll.

Each bar is preferably channel shaped, at least partially, its flanges extending away from the center of the roll. Each bar A and B has its flanges provided with a series of pins which are spaced apart in varying degrees according to a predetermined arrangement, the pins of the two flanges of each bar being arranged in registration. In accordance with the present invention, the pins are so arranged on each bar that the pins of the respective bars will cooperate with the cams to shift the woof wire 26 in such a manner, to be hereinafter more particularly described, that each such wire will be placed over a warp or line wire 25 in time to be twisted about the latter by the twisters 27, and then shifted laterally to the adjacent line wire and placed over the same in time to be twisted about the latter by corresponding twisters 27, and then shift the woof wire back to the first line wire and thus back and forth continuously, the fencing being thereby fabricated.

The illustrated form of the invention is arranged to fabricate a fence having three sizes of mesh, namely, 1", 1½" and 2".

It has been found that in the actual production of fabric of this character, the lateral tension of the woof wire is such that the mesh originally formed is contracted substantially ¼" when picked up by the roll 45 from the chain 15, so that in order to make mesh of the sizes just mentioned, it is desirable to originally form the mesh in the sizes of 1¼", 1¾" and 2¼".

Figure 13:
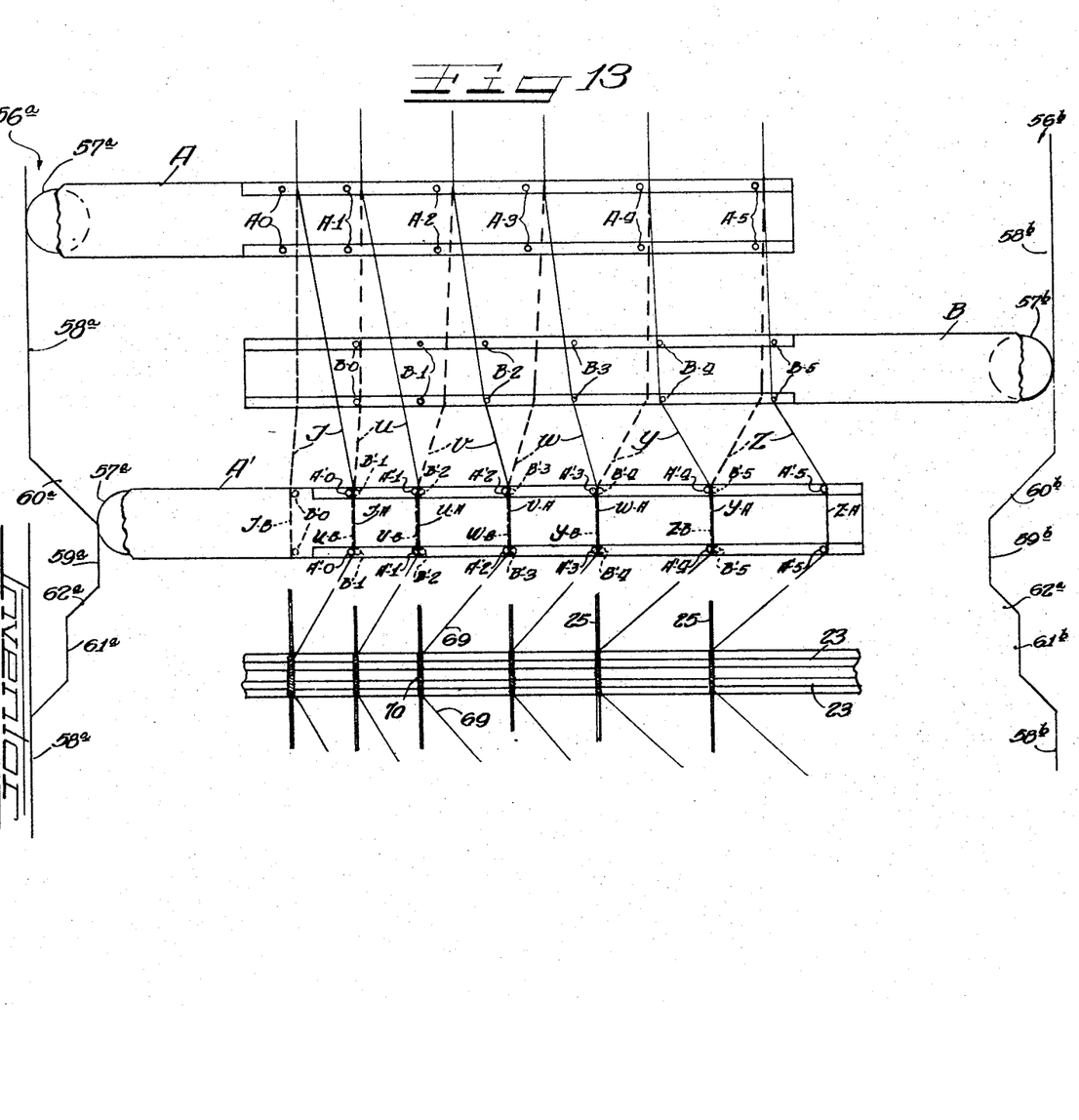
Figure 13 is a schematic view showing how the distributor head operates to shift different woof wires different distances, and a portion of the twisting mechanism after the shifted wires have been twisted.

Of course the arrangement of the pins on the flanges of the various distributor or transfer bars A and B will be such as to afford a fabrication of the desired overall widths for each size mesh, thus employing a corresponding number of wires, but, for the purpose of illustrating the operation of the distributor mechanism, the pins are so arranged in Figure 13 as to result in the production of fencing having two widths of 1¼" mesh, two widths of 1¾" mesh and two widths of 2¼" mesh. This arrangement is chosen merely to illustrate more clearly the arrangement of the pins whereby the woof wires will be shifted varying amounts depending upon the various sizes of mesh of the fence.

It will be noted that the pins on each bar B associated with the right cam 56$^b$ are most widely separated at the right, the pins B—5 and B—4 being 2¼" apart lengthwise of the bar, the pins B—4, B—3 and B—2 being successively 1¾" apart lengthwise of the bar, and the pins B—2, B—1 and B—0 being successively 1¼" apart lengthwise of the bar, corresponding with the different sizes of mesh to be made. The pins on each bar A, associated with the left hand cam, are arranged in substantially the same order from left to right as are the pins on each bar B, so that the pins on the bar A adjacent the corresponding left cam 56$^a$ are spaced successively 1¼" apart, the intermediate pins successively 1¾" apart, and the pins most remote from the left hand end are spaced successively 2¼" apart, lengthwise of the bar.

When the bars A and B have their rollers 57$^a$ and 57$^b$ disposed in the troughs 58$^a$ and 58$^b$ of the respective cams 56$^a$ and 56$^b$, the pins on the respective bars are arranged as shown in the various views, particularly Figure 13, with the pins B—0 slightly to the right of the pins A—1. Two more sets of pins, namely B—1 and B—2, respectively 1¼" apart lengthwise of the bar, are disposed to the right of the pins B—O, while the pins A—2 are spaced to the right of the pins A—1 a distance of 1¾", the width of the intermediate size mesh.

The woof or transfer wire to be shifted from side to side by the pins of the bars A and B comes from the source of supply and is initially passed about the upper and rear side of the transfer roll 53, and in the production of the fabric, leaves this roll when it reaches a point substantially between the crests of the respective cams, that is, approximately at the bottom of the roll. The wire is at this point deposited by each bar A, B, as it reaches this position, into a set of slots 24 and 28 in one of the transversely extending twisting mechanisms traveling forward on the chain 15 of the machine, by which mechanism the woof wire is twisted about the line wire in a manner elsewhere described.

Each woof wire is positioned or threaded with respect to the pins on the respective bars A and B contacted by the wire in such a manner that the wire will be shifted to the right by the bar A when the latter is shifted by the left cam 56ª, and thus deposited in one set of slots of one of the twisting mechanisms, and then the succeeding portion of the same wire is shifted to the left by corresponding pins on the bar B upon shifting of the latter to the left by the right cam 56ᵇ, said portion of the woof wire being thereupon deposited into a set of slots in the succeeding twisting mechanism, which set of slots is spaced to the left of the first mentioned set of slots of the preceding twisting mechanism by a distance which is equal to the size of mesh desired. The next succeeding portion of the wire will be shifted into a corresponding set of slots alined with the first mentioned set but in the next succeeding twisting mechanism and the operation is thus continued, first one bar A and then the other bar B shifting the wire into the appropriate set of slots of succeeding twisting mechanisms on the chain.

The letters T, U, V, W, Y, Z designate woof wires in accordance with the arrangement shown in Figure 13, which wires are shifted by the pins on the respective bars A and B the proper distances to correspond with the various sizes of mesh of the fabric to be produced. It will be noted that the woof wire T, for example, after leaving the source of supply, extends between the pins A—O and A—1 on the bar A and continues to the immediate left of the pins B—O, and thence is held in its extreme right position by the pins A'—O of the bar A', which is identical with bar A but has been shifted to the right a distance of 1¼" by the left cam 56ª to occupy the position shown. The woof wire T engages the pins A'—O with a certain degree of tension due to the fact that the preceding portion of this wire is held in a set of twisting mechanism slots displaced 1¼" to the left of the position of the wire T just described. When the bar A reaches the position shown at A', the pins A—O will occupy the positions shown as being occupied by the pins A'—O. When the wire T has been shifted to the position indicated at T—A, it bridges the gap between the flanges of the channel bar A', as seen in Figure 8, the bar A' being at this time disposed substantially at the bottom of the roll. As the bar A' reaches this position, a corresponding twisting mechanism, moving as part of the chain 15, is positioned between the flanges of the bar A' and with a set of its slots 24 and 28 in substantial register with the portion T—A of the wire T. The parts are so arranged that when the bar A' is most intimately associated with the corresponding twisting mechanism on the chain, that is, when they are closest to each other, the plane containing the free edges of the flanges will be close to the registering bottoms of said slots, as in Figure 8, so that the portion T—A of the wire T will be deposited by the bar A' in said slots in overlying relation to the line wire 26 already in said slots. As the bar A' continues its rotation with the roll 53 and the twisting mechanism moves forward away from said roll, the portion T—A remains in said set of slots in overlying relation to the line wire already in said slots, and the twisting mechanism is subsequently operated by the inclined portion 38 of the cam slot 33 to twist said portion T—A of the woof wire about the line wire.

As the bar A' moves on past the crest 59ª of the cooperating cam 56ª, the bar B is approaching the crest 59ᵇ of the right cam 56ᵇ by which it is to be actuated, and as the bar B rides up the inclined portion 60ᵇ of the cam 56ᵇ, the latter shifts the bar B to the left a total distance of 1¼", the various pins B—O, etc., of the bar B occupying the positions indicated by the reference characters B'—O, etc., in dotted lines in Figure 13. When the bars A and B move with their rollers 57ª, 57ᵇ in the troughs 58ª, 58ᵇ of the respective cams 56ª, 56ᵇ, the pins A—O are disposed slightly in excess of 1¼", constituting the full lateral stroke of each bar, to the left of the pins B—O. As a result, when the rollers engage the respective crests, a lost motion of substantially 1¼" in the shifting of the wire T will take place, so that the wire T will be shifted by the bars A and B to the extreme lateral positions shown respectively at T—A and T—B, which are substantially 1¼" apart and will be deposited in correspondingly spaced sets of slots 24, 28, in corresponding succeeding twisting mechanisms on the chain 15. The action of the pins on the woof wire U is the same as on the wire T.

Now let us consider the action of the bars on the woof wire V. Inasmuch as the pins A—2 are 1¾" from the pins A—1, lengthwise of the bar A, while the pins B—1 are only 1¼" from the pins B—O, and from the pins B—2, lengthwise of the bar B, it will be clear that the normal unshifted distance between the pins A—2 and B—2 lengthwise of the roll 53 is substantially ¾". Inasmuch as these sets of pins are given lateral strokes or throws of 1¼" in opposite directions toward each other it is obvious that if these sets of pins were in alignment, the total distance between the extreme shifted positions of the wire V would be 2½". By spacing the sets of pins as above indicated, it will be apparent that a lost motion of ¾" will result, so that the distance between the extreme positions of the wire V, indicated in full lines at V—A and in dotted lines at V—B, respectively, will be 1¾", which will correspond to the spacing of the sets of slots in the various twisting mechanisms connected to the chain. It will moreover be noted that the extreme left position of the portion V—B substantially coincides with the extreme right position of the portion U—A, and these portions will be alternately deposited in succeeding aligned sets of slots in succeeding twisting mechanisms and will be twisted about the same line wire.

The woof wire W will be shifted in exactly the same manner as the woof wire V, in view of the fact that the pins B—3 and A—3 bear the same relation to the wire W that the pins B—2 and A—2 bear to the wire V.

Inasmuch as the pins A—4 are spaced 2¼" from the pins A—3 and the latter are spaced from the pins B—3 approximately ¾", and the pins B—4 are spaced to the right of the pins B—3 1¾", it will be clear that the pins B—4 are positioned approximately ¼" to the right of the pins A—4. The wire Y is positioned between the pins B—4 and A—4, and when the parts are positioned as shown in Figure 13, with the bar A' indicating the position of the bar A when shifted 1¼" to the right, the portion Y—A of the wire Y is shifted as indicated in this figure, the pins A—4 having traveled 1¼". When the bar B is shifted 1¼" by the right cam 56ᵇ to the left, the pins B—4 will occupy the positions shown in dotted lines at B'—4, and the portion of the wire Y succeeding the portion Y—A will be shifted to the position indicated in dotted lines at Y—B. Were the pins B—4 aligned with the pins A—4, it is obvious that the distance between the extreme positions of the shifted portions Y—A and Y—B of the wire Y would be 2½". However in view of the fact that the pins B—4 are spaced ¼", approximately, from the pins A—4, it is clear that a lost motion of ¼" in shifting will result, so that the total distance between Y—A and Y—B must be substantially 2¼", which is the desired size of mesh.

The pins B—5, and A—5 bear substantially the same relation to the wire Z that the pins B—4 and A—4 bear to the wire Y, so it will be understood that the shifting of the wire Z will be identical with that of the wire Y, the wire Z in its extreme shifted positions being indicated respectively at Z—A and Z—B.

From the foregoing it will be clear not only that the succeeding portions V—B and U—A will be twisted alternately about the same line wire, but also that this will be true of the portions V—B and T—A, W—B and V—A, Y—B and W—A, and Z—B and Y—A, and the respective line wires alined with each of these pairs of portions.

It will of course be understood that the dimensions here used are chosen purely as exemplary, since by applying the principles of the present invention any sizes of mesh may be fabricated, either to the end that a single mesh or a multiple mesh fabric may be produced. It will be clear moreover that in accordance with this invention the woof wire is arranged in substantially herringbone fashion, as shown in the various figures of the drawings. This type of mesh is advantageous in that it retains its shape and avoids sagging even when in use.

Figures 7, 9:
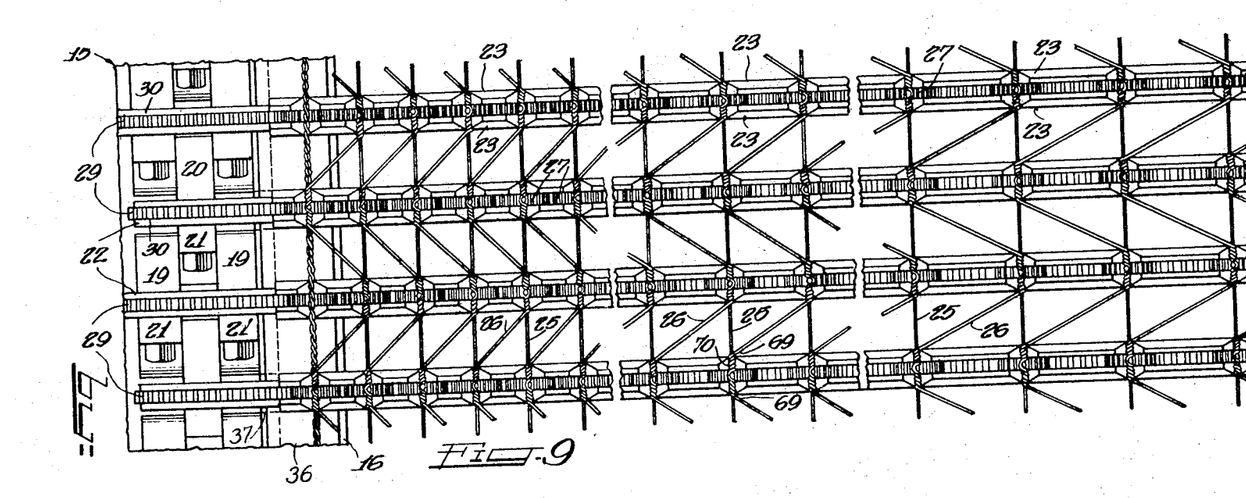
Figure 9 is a fragmentary plan view showing the wire fabric at the completion of the twisting operation.
Figure 10:
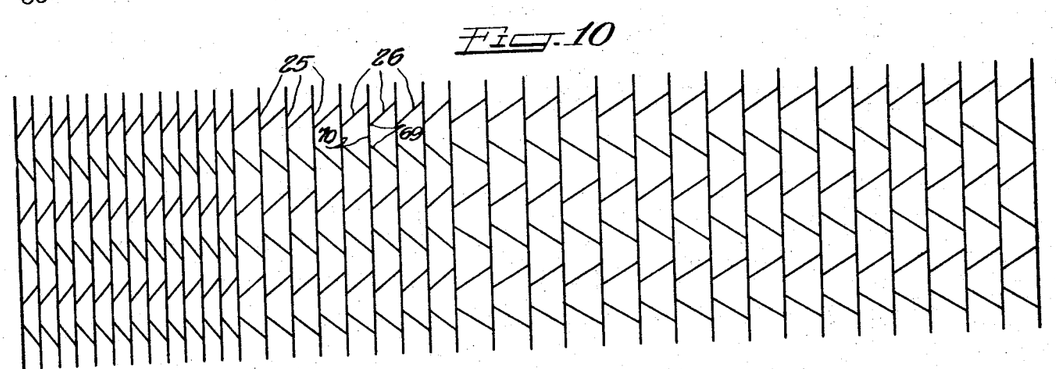
Figure 10 is a fragmentary diagrammatic view showing a portion of the finished product made in accordance with the present invention, having three different sizes of mesh.
Figure 11:
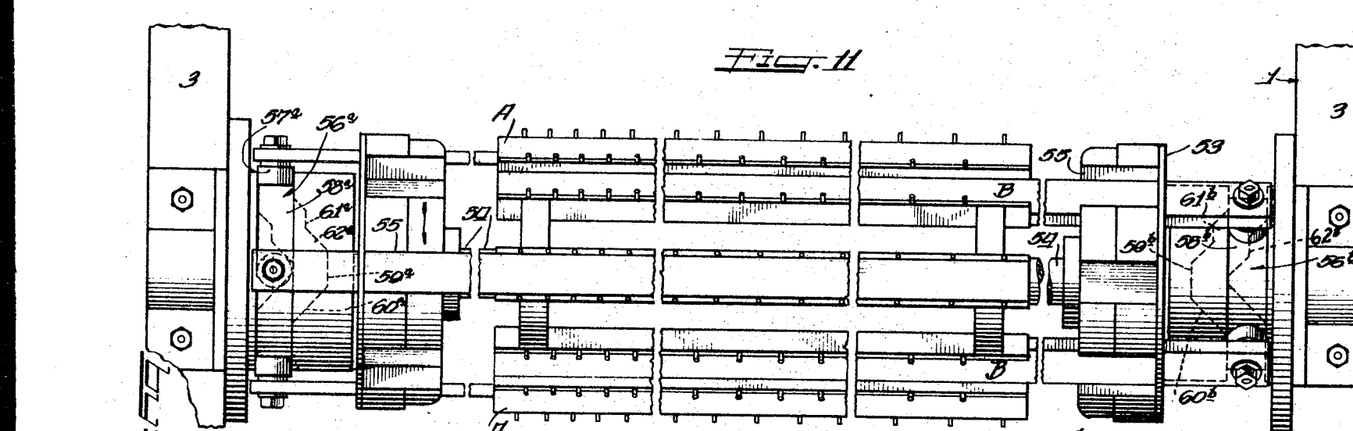
Figure 11 is an enlarged fragmentary plan view of the distributor head by which the woof wires or strands are shifted.
Figure 12:
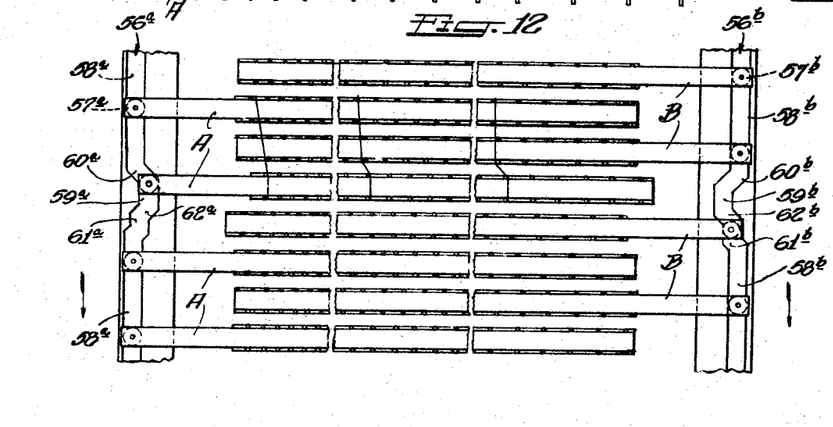
Figure 12 is a fragmentary schematic development of the mechanism shown in Figure 11.

The crest 59ᵃ, 59ᵇ, of each transfer roll cam 56ᵃ, 56ᵇ, is of such length that each bar A, B, is held thereby against movement in a direction parallel to the roll axis for a sufficient duration to insure the proper deposit of the portion of the transfer wire engaged by said bar into the twister slots (see Figure 8). However, once this is done, were the bar allowed to continue in the same movement, moving upward as indicated by the arrow 68 in Figure 1, the pins on the bar would hold the inclined portions 69 of the transfer wire 26 adjacent the ends of each twisted portion 70 (see Figures 9, 10 and 13) and cause said portions to be kinked. To avoid this, the bar A, B, is caused to shift outwardly by the inclined portion 62ᵃ, 62ᵇ, approximately one-half of its full stroke so that the pins are out of the way of, and will not interfere with, the inclined portions 69. The bar moves on again without shifting by virtue of the intermediate cam portion 61ᵃ, 61ᵇ, until its pins are drawn up clear of the fabric, whereupon it is shifted again until its rollers reach the dwell or trough 58ᵃ, 58ᵇ, of the cam. The bar then proceeds to repeat the operation.

*Operation of twisting mechanism.*—The slot 28 in each twist gear 27 has its bottom 63 disposed beyond the axis of the gear a distance substantially equal to half the diameter of the line wire 25, so that when the latter rests in said bottom, the wire and gear are coaxial. The plate slots 24 on opposite sides of each gear 27 have their bottoms 64 substantially in register or flush with the bottom 63 of the gear slot 28. As the chain progresses, the rollers 32 move outwardly in the inclined portions 38 and 39 of the guideways 33 and 34, thereby causing the racks 29 to move in the grooves 30 of the bars 22, which are held against such movement by the links 19 and 20 of the chain 15. The racks 29, being meshed with the twist gears 27, cause the latter to rotate. The transfer wire 26 having its axis spaced from the axis of the gear and line wire 25 therein, is twisted by the rotating gear about the line wire.

The inclined guideway portions 38 and 39 cause a movement of the racks 29 sufficient to rotate the gears 27 slightly in excess of two revolutions. The guideways 33 and 34 are formed adjacent the forward ends of the inclined portions 38 and 39 with returns 65 and 66 by which the gears are returned this excess distance to bring the gear slots 28 into register with the respective plate slots 24, to thereby permit withdrawal by the pick-up roll 45 of the fabric thus formed. The initial excess movement of the gears is needed because of the tension in the twisted wire 26 which tends to untwist when the gears stop. This tension spends itself in the partial return of the gear so that resistance of the fabric to withdrawal from the slots in minimized.

The finished fabric is withdrawn from the twisting mechanism by the pick-up roll 45, whose slots 44 receive the twisted portions, passes over a guide or tension idler roll 67 and then is wound about the reel 10. The various power transmitting instrumentalities are synchronized so that the surface speed is the same for the twisting mechanism and the various rolls.

It will be understood that while for the purpose of illustration the invention is here shown to be adapted for the production of wire or like fabric of progressively larger sizes of mesh, the invention is susceptible of use in forming other arrangements of mesh sizes and, if desired, for producing a single mesh fabric.

It will be clear from the foregoing that the two sets of pins, on adjacent bars A, B cooperating with each woof or mesh wire 26, in order to shift the various mesh wires 26 different distances for the various sizes of mesh, are spaced apart lengthwise of the transfer roll a distance substantially equal to the distance the bars are to be shifted to bring the portions of the mesh wires deflected thereby into line with the line wires 25. Otherwise stated, these sets of pins are, in their unshifted positions, spaced apart lengthwise of the transfer roll a distance substantially equal to the distance between the line wires 25 with which the mesh wire deflected by said sets of pins cooperates, less the combined distance the bars are shifted. If, as in the illustrated embodiment of the invention, both bars are shifted the same distance, then these sets of pins may be defined as spaced apart a distance substantially equal to the distance between the line wires with which the mesh wire 26 deflected by said sets of pins cooperates, less twice the distance each bar is shifted.

Another form of chain construction is illustrated in Figures 14 and 15, in which a portion of a chain section appears. The section consists of alternating or staggered substantially identical link elements 71, 72 and 73, the outer elements 71 and 73 straddling the inner elements 72. Pivot pins or rivets 74 pivotally connect the various link elements. The elements 71 and 72 are provided with projecting ears or lugs 75, 76, respectively to which the alternate rack guide bars 22 are secured as shown. It will be seen that with the guide bars 22 thus secured, the chain will progress in the direction indicated by the arrow at 77. With this form of chain construction, suitable guideways having straight walls straddling each chain section will be provided. However, if desired, certain of the outer link elements 71 may be provided with projections like the projections 37 of certain of the links 19 of the chain first described, the associated guideway wall being of course formed as shown at 36 (Figures 2, 6 and 7).

I am aware that many changes may be made and numerous details of construction may be varied through a wide range without departing from the principles of this invention, and I, therefore, do not desire to be limited in the patent granted hereon otherwise than necessitated by the prior art.

I claim as my invention:

1. In a machine for making wire fabric embodying line and woof wires, means for feeding a plurality of woof wires in substantial parallelism, two oscillatable bars over which the woof wires pass, means for oscillating said bars in opposite directions at different times in the travel of said woof wires, means on one bar for deflecting portions of said woof wires out of the usual direction of movement thereof when said bar is moved in one direction, means on the other bar for deflecting other portions of said wires out of the usual direction of movement thereof and opposite to the deflection caused by the first bar, and means for wrapping the deflected portions about the line wires.

2. In a wire fabric making machine including a movable endless series of twisting mechanisms having slotted twisters in which a pair of line wires of the fabric are carried: a device for feeding a woof wire in a zig-zag fashion by depositing a portion of the same in a twister containing one line wire and the next succeeding portion in the twister of the next succeeding mechanism containing the other line wire, said device comprising shifting means between which the woof wire is disposed, and instrumentalities for successively moving said means against the woof wire to successively shift said portions of the woof wire in opposite directions into the twisters containing the line wires.

3. In a wire fabric making machine including a movable endless series of twisting mechanisms having slotted twisters in which a pair of line wires of the fabric are carried: a device for feeding a woof wire in a zig-zag fashion by depositing a portion of the same in a twister containing one line wire and the next succeeding portion in the twister of the next succeeding mechanism containing the other line wire, said device comprising shifting means between which the woof wire is disposed, and instrumentalities for successively moving said means against the woof wire to successively shift said portions of the woof wire in opposite directions into the twisters containing the line wires, said means being spaced apart in the direction in which they are shifted a distance equal substantially to the combined distance thru which said means are shifted minus the distance between the line wires.

4. In a fabric making machine of the type wherein each woof wire is given a zig-zag motion for alternate wrapping or twisting about adjacent line wires, a device for imparting a zig-zag motion to each woof wire between each pair of line wires, said device comprising shifting means for shifting successive portions of the woof wire alternately in opposite directions, and instrumentalities for shifting said means, said means being spaced apart, in the direction in which they are shifted, a distance substantially equal to the combined distance thru which said means are shifted, less the distance between the line wires.

5. In a fabric making machine of the type wherein each woof wire is given a zig-zag motion for alternate wrapping or twisting about adjacent line wires, a device for imparting a zig-zag motion to each woof wire between each pair of line wires, said device comprising shifting means for shifting successive portions of the woof wire alternately in opposite directions, and instrumentalities for shifting said means, each of said means, before the same is shifted, being spaced from the non-adjacent line wire a distance substantially equal to the distance said means is shifted.

6. In a wire fabric making machine including a movable endless series of twisting mechanisms having slotted twisters in which a pair of line wires of the fabric are carried: a device for feeding a woof wire in a zig-zag fashion by depositing a portion of the same in a twister containing one line wire and the next succeeding portion in the twister of the next succeeding mechanism containing the other line wire, said device comprising shifting means between which the woof wire is disposed, and instrumentalities for successively moving said means against the woof wire to successively shift said portions of the woof wire in opposite directions into the twisters containing the line wires, each of said means, before the same is moved, being spaced from the non-adjacent line wire a distance substantially equal to the distance said means is shifted.

7. In a machine for making fabric embodying line and woof wires, means for feeding a plurality of woof wires in substantial parallelism, oscillatable bars over which the woof wires pass, and by which the woof wires are guided to the line wires, means for oscillating alternate bars in opposite directions, instrumentalities associated with said bars for deflecting alternate portions of each woof wire in opposite directions into cooperative relation with each pair of adjacent line wires, and means for wrapping each portion about the line wire with which it cooperates.

8. In a machine for making fabric embodying line and woof wires, means for feeding a plurality of woof wires in substantial parallelism, oscillatable bars over which the woof wires pass, and by which the woof wires are guided to the line wires, means for oscillating alternate bars in opposite directions, when each bar reaches a predetermined position, and means for wrapping each woof wire about the line wire with which it cooperates.

9. In a machine for making fabric embodying line and woof wires, means for feeding a plurality of woof wires in substantial parallelism, oscillatable bars over which the woof wires pass, and by which the woof wires are guided to the line wires, cam means for oscillating alternate bars in opposite directions, instrumentalities associated with said bars for deflecting alternate portions of each woof wire in opposite directions into cooperative relation with each pair of adjacent line wires, and means for wrapping each portion about the line wire with which it cooperates.

10. In a machine for making fabric embodying line and woof wires, means for feeding a plurality of woof wires in substantial parallelism, oscillatable bars over which the woof wires pass, and by which the woof wires are guided to the line wires, means for oscillating alternate bars in opposite directions, instrumentalities associated with said bars for deflecting alternate portions of each woof wire in opposite directions into cooperative relation with each pair of adjacent line wires, and means for wrapping each portion about the line wire with which it cooperates and means for moving the bars over which the woof wires pass toward the line wires in a direction transverse to the directions in which the bars are oscillated.

11. In a fabric making machine of the type wherein each woof wire is given a zig-zag motion for alternate wrapping or twisting about adjacent line wires, a device for imparting a zig-zag motion to each woof wire between each pair of line wires, said device comprising shifting means for shifting successive portions of the woof wire alternately in opposite directions, and instrumentalities for shifting said means, each of said means, before the same is shifted being spaced from the non-adjacent line wire a distance substantially equal to the distance said means is shifted, and not in excess of the distance between the line wires.

12. In a wire fabric making machine including a movable endless series of twisting mechanisms having slotted twisters in which a pair of line wires of the fabric are carried; a device for feeding a woof wire in a zig-zag fashion by depositing a portion of the same in a twister containing one line wire and the next succeeding portion in the twister of the next succeeding mechanism containing the other line wire, said device comprising shifting means between which the woof wire is disposed, and instrumentalities for successively moving said means against the woof wire to successively shift said portions of the woof wire in opposite directions into the twisters containing the line wires, each of said means including elements spaced apart a distance in excess of the width of, and adapted when shifted in one direction to straddle and deposit the portion of the woof wire shifted thereby into, a twister containing one of the line wires.

13. In a wire fabric making machine including a movable endless series of twisting mechanisms having slotted twisters in which a pair of line wires of the fabric are carried: a device for feeding a woof wire in a zig-zag fashion by depositing a portion of the same in a twister containing one line wire and the next succeeding portion in the twister of the next succeeding mechanism containing the other line wire, said device comprising shifting means between which the woof wire is disposed, and instrumentalities for successively moving said means against the woof wire to successively shift said portions of the woof wire in opposite directions into the twisters containing the line wires, said means forming a movable endless series.

14. In a wire fabric making machine including a movable endless series of twisting mechanisms having slotted twisters in which a pair of line wires of the fabric are carried; a device for feeding a woof wire in a zig-zag fashion by depositing a portion of the same in a twister containing one line wire and the next succeeding portion in the twister of the next succeeding mechanism containing the other line wire, said device comprising a movable endless series of channel bars extending in substantial parallelism with said mechanisms, each bar at predetermined times straddling one of said mechanisms, guides carrying said bars and in which said bars are oscillatable in a direction parallel to said bars, stationary cams associated with said bars and arranged to oscillate alternate bars in opposite directions as they approach said mechanisms, each bar having on its flanges cooperating pins alined transversely of the bar and spaced from the non-adjacent line wire, in a direction parallel to the bar, a distance substantially equal to the distance the bar is shifted, the pins on each bar being disposed on opposite sides of the woof wire, the flanges, when straddling one of the mechanisms, extending in proximity to the bottom of the slot of a twister containing one of the line wires, whereby the portion of the woof wire shifted by said pins is deposited in the slot by the flanges of the bar.

15. In a machine for making wire fabric embodying line and woof wires, movable twisting mechanisms carrying line wires, a device for feeding and deflecting alternate portions of the woof wires straddling each line wire into cooperative relation with successive portions of said line wire, and means for twisting the deflected portions about the line wire without twisting the wire.

16. In a machine for making multi-mesh wire fabric, a series of line wires spaced apart varying amounts in accordance with a predetermined multi-mesh, slotted twisters carrying said wires, a series of mesh wires in staggered relation to the line wires, a device for causing the mesh wires to approach the line wires longitudinally and transversely, said device comprising shifting members, each member having sets of pins engageable with the mesh wires and arranged in the same relation as the line wires, each set being spaced from the first line wire toward which it shifts transversely, a distance in that direction substantially equal to the distance it shifts, whereby said mesh wires are shifted into substantial alinement with said line wires and into the twisters, and means for operating said twisters when the mesh wires are deposited therein.

17. In a wire fabric making machine including a movable endless series of twisting mechanisms having slotted twisters in which a pair of line wires of the fabric are carried; a device for feeding a woof wire in a zig-zag fashion by depositing a portion of the woof wire in a twister containing one line wire and the next succeeding portion of the woof wire in the twister of the next succeeding mechanism containing the other line wire, said device comprising shifting means movable at the same speed as said series and between which the woof wire is disposed, and instrumentalities for successively moving said means against the woof wire to successively shift said portions of the woof wire in opposite directions into the twisters containing the line wires.

18. In a fabric making machine of the type wherein each woof wire is given a substantially zig-zag motion for alternate wrapping or twisting about adjacent line wires, a device for imparting a zig-zag motion to each woof wire between each pair of line wires, said device comprising alternate longitudinally movable shifting means, each of said means being provided for shifting a portion of the woof wire in one direction, said device comprising shifting means alternating with the first mentioned shifting means, each of the second shifting means being provided for shifting a succeeding portion of the woof wire in the opposite direction, and instrumentalities for moving the different means, one at a time, alternately.

19. In a fabric making machine of the type wherein each woof wire is given a substantially zig-zag motion for alternate wrapping or twisting about adjacent line wires, a device for imparting a zig-zag motion to each woof wire between each pair of line wires, said device comprising alternate longitudinally movable shifting means, each of said means being provided for shifting a portion of the woof wire in one direction, said device comprising shifting means alternating with the first mentioned shifting means, each of the second shifting means being provided for shifting a succeeding portion of the woof wire in the opposite direction, and instrumentalities for moving the different means, one at a time, alternately, each of said means, before the same is shifted, being spaced from the line wire toward which it is to be shifted, a distance not in excess of the distance between the line wires between which the woof wire, shifted by said means, moves.

20. In a machine for making fabric embodying line and woof wires, means for feeding a plurality of woof wires in substantial parallelism, oscillatable bars over which the woof wires pass, and by which the woof wires are guided to the line wires, means for oscillating alternate bars in opposite directions, when each bar reaches a predetermined position, means for wrapping each woof wire about the line wire with which it cooperates, and means for causing each bar to approach and recede from the line wires, so that as each bar guides a woof wire to a line wire, said bar moves out of the way to permit the succeeding bar to guide the woof wire to a line wire.

21. In a wire fabric making machine including an endless series of twisting mechanisms movable transversely to their length, each mechanism having at least three slotted twisters alined, in the direction of movement of the series, with the twisters of the other mechanisms, for carrying parallel line wires, the second twister of each mechanism being closer to the first twister than to the third twister, the distance between the first and second twisters being not less than one-half the distance between the second and third twisters, means for feeding a woof wire in zig-zag fashion between and into the first and second twisters of alternate mechanisms and a second woof wire in zig-zag fashion between and into the second and third twisters of said alternate mechanisms, said means including members movable in one direction transversely of the wires for shifting the woof wires into the first and second twisters, respectively, of each mechanism, and other members alternating with the first named members and movable in the opposite direction for thereafter shifting the woof wires into the second and third twisters, respectively, and means for operating the twisters to twist the woof wire portions deposited thereinto about the line wires.

22. In a machine for fabricating line and woof wires together, means for feeding woof wires in given spaced relation, a plurality of oscillatory means by which the woof wires are guided to the line wires, means for oscillating alternate of said means in opposite directions when each of said means reaches a predetermined position, and means for wrapping each woof wire about the line wire with which it cooperates.

23. In a wire fabric making machine including an endless series of twisting mechanisms movable transversely to their length, each mechanism having at least three slotted twisters alined, in the direction of movement of the series, with the twisters of the other mechanisms, for carrying parallel line wires, the second twister of each mechanism being closer to the first twister than to the third twister, means for feeding a woof wire in zig-zag fashion between and into the first and second twisters of alternate mechanisms and a second woof wire in zig-zag fashion between and into the second and third twisters of said alternate mechanisms, said means including members movable in one direction transversely of the wires for shifting the woof wires into the first and second twisters, respectively, of each mechanism, and other members alternating with the first named members and movable in the opposite direction for thereafter shifting the woof wires into the second and third twisters, respectively, and means for operating the twisters to twist the woof wire portions deposited thereinto about the line wires.

24. In a machine for making wire fabric embodying line wires and woof wires, an endless series of twister mechanisms, means for causing movement of said mechanisms and twisting operations thereby, said mechanisms having means for carrying three line wires in parallelism and in progressively increasing spaced relation: means for carrying a pair of woof wires simultaneously in the direction of movement of said series and at the same speed as said series, and for weaving said woof wires simultaneously in parallelism by moving them in zig-zag fashion between the respective pairs of line wires, said means including a weaving member movable through a fixed distance in one direction for moving said woof wires into juxtaposition with the second and third line wires, and another weaving member movable through a fixed distance in the opposite direction for moving said woof wires respectively into juxtaposition with the first and second line wires.

25. In a machine for making wire fabric embodying line wires and woof wires, an endless series of twister mechanisms, means for causing movement of said mechanisms and twisting operations thereby, said mechanisms having means for carrying three line wires in parallelism and in progressively increasing spaced relation: means for carrying a pair of woof wires simultaneously in the direction of movement of said series and at the same speed as said series, and for weaving said woof wires simultaneously in parallelism by moving them in zig-zag fashion between the respective pairs of line wires, said means including a weaving member movable through a fixed distance in one direction for moving said woof wires into juxtaposition with the second and third line wires, and another weaving member movable through the same distance but in the opposite direction for moving said woof wires respectively into juxtaposition with the first and second line wires.

26. In a machine for making wire fabric embodying line wires and woof wires, an endless series of twister mechanisms, means for causing movement of said mechanisms and twisting operations thereby, said mechanisms having means for carrying three line wires in parallelism and in progressively increasing spaced relation: means for carrying a pair of woof wires simultaneously in the direction of movement of said series and at the same speed as said series, and for weaving said woof wires simultaneously in parallelism by moving them in zig-zag fashion between the respective pairs of line wires, said means including a weaving member movable through a fixed distance in one direction for moving said woof wires into juxtaposition with the second and third line wires, and another weaving member movable through a fixed distance in the opposite direction for moving said woof wires respectively into juxtaposition with the first and second line wires, said members having means for engaging said woof wires in shifting the same, the last named means of the first member being spaced apart substantially the distance between the second and third line wires and straddling the woof wire movable between the first and second line wires, and the last named means of the other member being spaced apart substantially the distance between the first and second line wires and straddling the other woof wire.

27. In a machine for making wire fabric embodying line wires and woof wires, an endless series of twister mechanisms, means for causing movement of said mechanisms and twisting operations thereby, said mechanisms having means for carrying three line wires in parallelism and in progressively increasing spaced relation: means for carrying a pair of woof wires simultaneously in the direction of movement of said series and at the same speed as said series, and for weaving said woof wires simultaneously in parallelism by moving them in zig-zag fashion between the respective pairs of line wires, said means including a weaving member movable through a fixed distance in one direction for moving said woof wires into juxtaposition with the second and third line wires, and another weaving member movable through a fixed distance in the opposite direction for moving said woof wires respectively into juxtaposition with the first and second line wires, and fixed guides for conducting the woof wires to the first means in substantially parallel lines under tension, whereby said woof wires remain in contact with the respective shifting means from the time of engagement therewith substantially throughout the shifting movement.

28. In a machine for making wire fabric embodying line wires and woof wires, an endless series of twister mechanisms, means for causing movement of said mechanisms and twisting operations thereby, said mechanisms having means for carrying three line wires in parallelism and in progressively increasing spaced relation: means for carrying a pair of woof wires simultaneously in the direction of movement of said series and at the same speed as said series, and for weaving said woof wires simultaneously in parallelism by moving them in zig-zag fashion between the respective pairs of lines wires, said means including a weaving member movable through a fixed distance in one direction for moving said woof wires into juxtaposition with the second and third line wires, and another weaving member movable through a fixed distance in the opposite direction for moving said woof wires respectively into juxtaposition with the first and second line wires, said members having means for engaging said woof wires in shifting the same, the last named means of the first member being spaced apart substantially the distance between the second and third line wires and straddling the woof wire movable between the first and second line wires, and the last named means of the other member being spaced apart substantially the distance between the first and second line wires and straddling the other woof wire, and instrumentalities for operating said members alternately, said instrumentalities including mechanism for return shifting each member to prevent interference thereof with the weaving action of the succeeding member.

ALBERT BRADLEY.